(12) United States Patent
Komatsu

(10) Patent No.: US 6,859,724 B2
(45) Date of Patent: Feb. 22, 2005

(54) METHOD OF SEARCHING FOR GUIDANCE ROUTE IN NAVIGATION DEVICE

(75) Inventor: Michihisa Komatsu, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 10/260,743

(22) Filed: Sep. 30, 2002

(65) Prior Publication Data

US 2003/0078727 A1 Apr. 24, 2003

(30) Foreign Application Priority Data

Oct. 12, 2001 (JP) ........................................ 2001-315168

(51) Int. Cl.⁷ ............................ G06F 19/00; G06F 7/00
(52) U.S. Cl. ........................ 701/202; 701/207; 701/209; 340/988; 340/990; 340/994; 342/457.13
(58) Field of Search ................................ 701/200–215, 701/24–26; 340/988, 990, 994, 995.1; 707/102; 705/400, 417; 342/457.13, 443, 457

(56) References Cited

U.S. PATENT DOCUMENTS

| | | | |
|---|---|---|---|
| 5,983,158 A | | 11/1999 | Suzuki et al. ............... 701/209 |
| 6,091,956 A | * | 7/2000 | Hollenberg ................ 455/456 |
| 6,263,277 B1 | * | 7/2001 | Tanimoto et al. ........... 701/209 |
| 6,278,943 B1 | * | 8/2001 | Yamauchi .................. 701/211 |
| 6,321,161 B1 | * | 11/2001 | Herbst et al. ............... 701/210 |
| 6,418,373 B1 | * | 7/2002 | Omi et al. .................. 701/209 |
| 6,470,266 B1 | * | 10/2002 | Ito et al. .................... 701/209 |
| 6,522,875 B1 | * | 2/2003 | Dowling et al. ............ 455/414 |
| 2001/0021895 A1 | * | 9/2001 | Yamazaki ................... 701/211 |
| 2002/0027512 A1 | * | 3/2002 | Horita et al. ............... 340/988 |
| 2003/0018428 A1 | * | 1/2003 | Knockeart et al. .......... 701/210 |
| 2003/0028320 A1 | * | 2/2003 | Niitsuma .................... 701/210 |

* cited by examiner

Primary Examiner—Thomas G. Black
Assistant Examiner—Ronnie Mancho
(74) Attorney, Agent, or Firm—Brinks Hofer Gilson & Lione

(57) ABSTRACT

A guidance route search method in a navigation device is provided for searching for a guidance route which leads to a destination through a road that meets a user's needs. A first route from a starting point to a destination is searched for or retrieved, and intersections included in the first route are displayed in list form. When a user designates a desired intersection from the intersections included in the first route, and a travel direction of a vehicle beyond the intersection, the navigation device sets low a link cost of a road which leads from the designated intersection in the designated travel direction, and performs another route search for a route (second route) leading from the intersection to the destination. The navigation device connects the resultant second route and a portion of the first route between the starting point and the designated intersection, to provide the final guidance route.

17 Claims, 7 Drawing Sheets

FIG. 3

| Maneuver List | |
|---|---|
| ⬅ W 190THST | 1.1mil |
| ➡ PRAIRIE AVE | 1.7mil |
| ⬅ W CARSON ST | 0.7mil |
| ◎ DEL AMO FASHION CENTER | |

METHOD OF SEARCHING FOR GUIDANCE ROUTE IN NAVIGATION DEVICE

BACKGROUND OF THE INVENTION

1. Field of the Invention

The present invention relates to a guidance route search method of searching for an optimal guidance route from a starting point to a destination in a navigation device and, more particularly, to a guidance route search method of searching for a guidance route matching a user's needs.

2. Description of the Related Art

A known vehicle navigation device includes a map-data storage section for storing map data such as a DVD (Digital Versatile Disk)—ROM or the like, a display for displaying a map image, and a vehicle position detector for detecting a present position and a present traveling direction of a vehicle, such as a gyro, a GPS (Global Positioning System) receiver, a vehicle speed sensor, and the like. The navigation device reads from the map-data storage section the map data containing information on the present position of the vehicle, and draws the map image covering the present vehicle position and its surroundings based on the map data, while also drawing a vehicle position (location) mark superimposed on the map image. The navigation device makes the map image scrollable, or makes the vehicle position mark movable in accordance with the travel of the vehicle with the map image being stationary on a screen, thus allowing a user to understand the present traveling position of the vehicle at a glance.

Generally, the vehicle navigation device has the function of route guidance that enables the user to easily travel an appropriate route to the desired destination without taking a wrong path. This route guidance function automatically searches for a route connecting the starting point to the destination and having a lowest cost, by performing a simulated calculation, such as the lateral search method or the Dijkstra method, using the map data, and stores the resultant searched route as a guidance route. During traveling, the route guidance function draws the guidance route on the map image of the screen by a solid line in a different color from that of the other roads. When the vehicle is approaching within a certain distance of an intersection to change course on the guidance route, the route guidance function draws an arrow at the intersection on the map image to indicate the traveling direction beyond the intersection, thus guiding the user to the destination.

The aforesaid cost is set in terms of a value obtained from multiplying a travel distance of a road by a constant corresponding to the width of the road, the type of the road (general road, or highway), the direction of a turn, namely a right turn or left turn, or the like, or in terms of a time required for the vehicle to pass through the road on the basis of the distance traveled thereon. Thus, the cost is a numeric value indicating the degree of propriety as the guidance route. Even if there are two roads with the same travel distance, the cost depends on, for example, whether the user makes use of a highway or not, or whether the user gives a higher priority to the time or the distance.

However, the guidance route which is automatically searched for or found by the vehicle navigation device does not always meet the user's needs or preferences. For example, the following cases may occur: a case where the resultant guidance route includes a road with a heavy traffic jam anticipated, or a road without fine scenery; or a case where there is another road not included in the guidance route and which the user is accustomed to traveling. In such cases, the conventional navigation device is designed to set a transit point (pass-through point) and to search for a guidance route including the transit point, thereby handling the described problems to some extent. Even though the transit point is previously set as described above, a guidance route is not necessarily searched for or found that leads to the transit point through the user's desired road. As is often the case with the conventional navigation device, the resultant searched route does not match or satisfy the user's needs.

Another known navigation device has been proposed that searches for a plurality of guidance routes at one time to present them to a user, and requests the user to select his/her desired one from these guidance routes. However, the plurality of guidance routes searched for does not necessarily include the user's desired route.

Conventionally, still another known navigation device has been developed for previously designating a road (Avoidance Street) which a user would not like to pass through. In this device, although a searched guidance route bypasses the road designated by the user, the resultant searched guidance route does not always fit the user's needs.

SUMMARY OF THE INVENTION

The present invention has been accomplished in view of the above-mentioned technical background, and it is an object of the present invention to provide a guidance route search method in a navigation device of searching for a guidance route to a destination through a road that satisfies a user's needs.

According to one aspect of the present invention, there is provided a guidance route search method in a navigation device that comprises the steps of, when an intersection and a travel direction of a vehicle beyond the intersection are designated, setting low a link cost of a road which leads from the designated intersection in the designated direction, and searching for a guidance route from the starting point to the destination through the intersection.

According to another aspect of the present invention, there is provided a guidance route search method in a navigation device that comprises the steps of searching for a first route from a starting point to a destination; searching for a second route, when a specific intersection from one or more intersections included in the first route and a travel direction of a vehicle beyond the intersection are designated, the second route leading from the specific intersection in the designated travel direction up to the destination; and connecting the second route and a portion of the first route that leads from the starting point to the specific intersection, to form the guidance route.

One of the reasons a guidance route searched for or found by a navigation device does not meet a user's needs is that the guidance route does not always include a road proceeding in a user's desired direction beyond an intersection. For instance, even though the user designates an intersection (transit point) to perform a route search for the guidance route by means of the navigation device so as to obtain his/her desired route, the guidance route automatically searched for by the navigation device incorporates the designated intersection, but often does not include a road which leads beyond the intersection in the user's desired direction.

In one method of the present invention, when the user designates an intersection and a travel direction beyond the intersection, a link cost of a road leading from the designated intersection in the designated direction is set low, and a guidance route is searched for or retrieved that leads from a starting point to a destination. Thus, the guidance route passing through the designated intersection in the designated direction is searched for and obtained to meet his/her needs.

In another method of the present invention, after performing a route search for a guidance route (first route) from a starting point to a destination, a specific intersection from intersections included in this guidance route and a travel direction beyond the specific intersection may be designated, and then a search for another guidance route may be carried out. In this case, a second route is searched for or retrieved that leads from the specific intersection in the designated direction up to the destination, and this second route is connected to a portion of the first route leading from a starting point to the specific intersection, thereby to provide a guidance route leading from the starting point to the destination through the designated intersection and in the designated direction beyond the intersection.

BRIEF DESCRIPTION OF THE DRAWINGS

FIG. 3 is an exemplary diagram of a display screen after searching for a guidance route (first route).

DESCRIPTION OF THE PREFERRED EMBODIMENTS

Hereinafter various preferred embodiments of the present invention will be described in detail with reference to the accompanying drawings.

Figure 1:
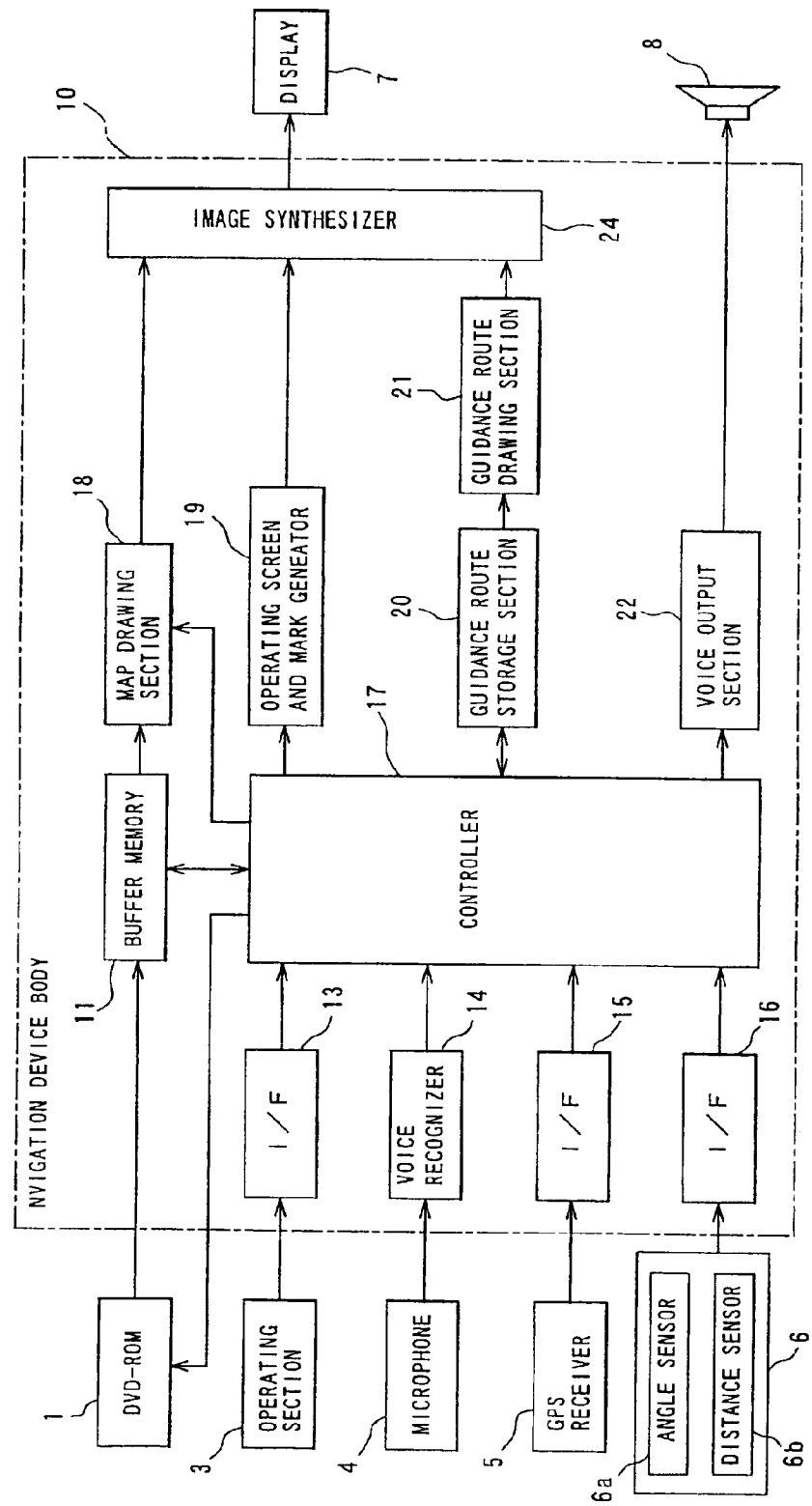
FIG. 1 is a block diagram of a vehicle navigation device which employs a guidance route search method of one preferred embodiment according to the present invention.

FIG. 1 is a block diagram of a vehicle navigation device which employs a guidance route search method of one preferred embodiment according to the present invention.

Reference numeral 1 denotes a DVD-ROM for storage of map data. The map data stored therein is divided into pieces, each of which has proper longitudinal and latitudinal ranges corresponding to a reduced scale level, such as 1/12500, 1/25000, 1/50000, 1/100000, or the like. Each road or the like is stored as a pair of longitude and latitude coordinates of points (nodes). A road is expressed as a connection between two or more nodes, and the part connecting two nodes is called a link.

In addition to the above-mentioned map data, a facility database is stored in the DVD-ROM 1. In the facility database, a number of facilities are classified by categories, including a shopping center, a gas station, and a sight-seeing place, and position data and other data on each classified facility is recorded therein.

Figure 2:
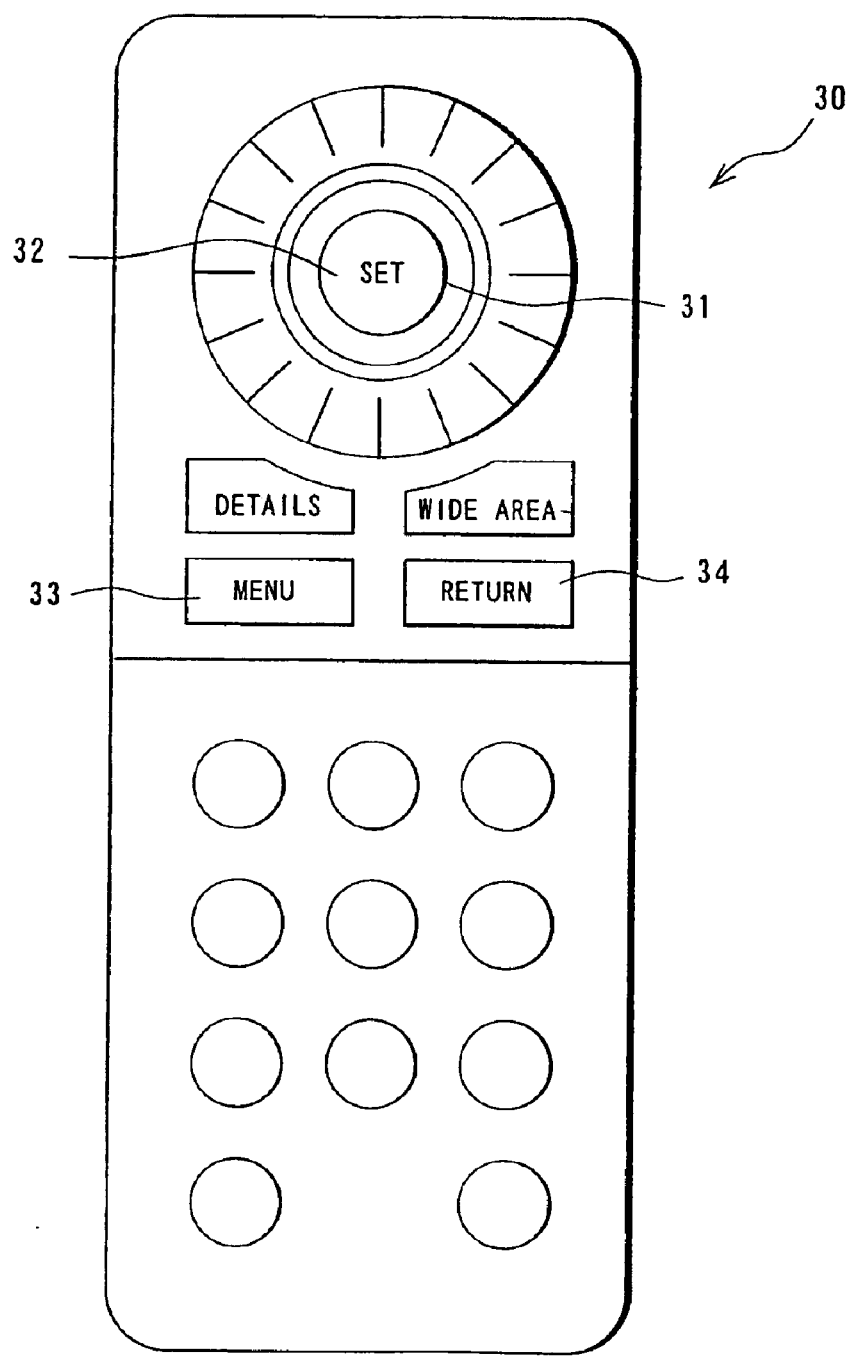
FIG. 2 is a plan view of a remote control transmitter of the vehicle navigation device.

Reference numeral 3 denotes an operating section for the operation of a navigation device body 10 explained later. In the preferred embodiment, the operating section 3 includes a remote control transmitter 30 as shown in FIG. 2, and a receiver for receiving a signal from the remote control transmitter 30. The remote control transmitter 30 includes a joy stick 31, a set (enter) button 32, a menu button 33, a return (cancel) button 34, and the like.

The operating section 3 may include a touch panel. In this case, the touch panel is attached onto a screen of a display 7 described later, and when a user touches the screen, it produces a signal corresponding to a touched position thereon.

Reference numeral 4 denotes a microphone for voice entry that permits an operation by voice. The microphone 4 is mounted at a location to fully capture a driver's voice. Reference numeral 5 denotes a GPS (global positioning system) receiver for receiving a GPS signal transmitted from a GPS satellite to detect the longitude and latitude of a present position of the vehicle. Reference numeral 6 denotes a self-contained navigation sensor, which has an angle sensor 6a such as a gyro for detecting a rotation angle of the vehicle, and a travel distance sensor 6b for generating a pulse at regular travel intervals.

Reference numeral 7 denotes a display such as a liquid crystal panel. On the display 7, the navigation device body 10 displays a map covering the present position of the vehicle and its surroundings, and various kinds of guidance information. Reference numeral 8 denotes a speaker for communicating the guidance information to the user by voice.

The navigation device body 10 includes the following components. Reference numeral 11 denotes a buffer memory for temporarily storing the map data read from the DVD-ROM 1. An interface, indicated at 13, is connected to the operating section 3. An interface, indicated at 15, is connected to the GPS receiver 5. An interface, indicated at 16, is connected to the self-contained navigation sensor 6.

Reference numeral 14 denotes a voice recognizer for performing voice recognition processing on a voice signal produced as an output from the microphone 4 to generate a command corresponding to the recognized result.

Reference numeral 17 denotes a controller that includes a microcomputer. The controller 17 carries out various kinds of processing, namely, it detects the present position of the vehicle based on information received from the interfaces 15 and 16, reads the predetermined map data from the DVD-ROM 1 into the buffer memory 11, and searches for a guidance route under set searching criteria using the map data read from the buffer memory 11.

Reference numeral 18 denotes a map drawing section for generating or drawing a map image, using the map data read from the buffer memory 11. Reference numeral 19 denotes an operating screen and mark generator for creating various types of menu screens (operating screens) in response to operation states, and various kinds of marks, such as a vehicle position mark and a pointer.

Reference numeral 20 denotes a guidance route storage section for storing the guidance route searched for or retrieved by the controller 17, and reference numeral 21 denotes a guidance route drawing section for drawing the guidance route. In the guidance route storage section 20, all nodes of the guidance route from the starting point to the destination that have been found by the controller 17 are stored. The guidance route drawing section 21, when displaying the map image, reads guidance route information (node rows) from the guidance route storage section 20 to draw the guidance route by a line with a color and thickness different than those of the other roads.

Reference numeral 22 denotes a voice output section for supplying a voice signal to the speaker 8 based on a signal from the controller 17.

Reference numeral 24 denotes an image synthesizer for superimposing, for example, various marks generated by the operating screen and mark generator 19, the guidance route drawn by the guidance route drawing section 21, and the map image drawn by the map drawing section 18, to display them on the display 7.

In the navigation device thus constructed, the controller 17 detects or senses the present position of the vehicle on the basis of the GPS signal received by the GPS receiver 5 and a signal received from the self-contained navigation sensor 6. The map data covering the vicinity of the present vehicle position is read from the DVD-ROM 1 to be stored in the buffer memory 11. Thereafter, the map drawing section 18 generates the map image from the map data read from the buffer memory 11 in response to the signal from the controller 17, and displays the map image on the display 7.

While the vehicle travels, the controller 17 also detects the present position of the vehicle on the basis of the signals received from the GPS receiver 5 and the self-contained navigation sensor 6, to display the guidance information on the display 7, or to provide the guidance information from the speaker 8 by voice, in accordance with the detected result.

The method of searching for the guidance route with the navigation device according to the preferred embodiment of the present invention will be described below.

When a user designates a destination, the controller 17 determines a present position of a vehicle as a starting point and performs a route search for a route having the lowest cost from the starting point to the destination, to set the resultant route as a guidance route (first route). In this case, the user may designate a transit point (pass-through point), and the navigation device may conduct the route search for a route passing through the designated transit point. There have been proposed various methods for designating the destination or the transit point, such as a method of specifying one location on a map image which is displayed on the display 7 by a pointer using the joy stick 31, or a method of specifying a desired facility using the facility database in the DVD-ROM 1.

The controller 17 stores the resultant guidance route in the guidance route storage section 20, while displaying it on the display 7 in list form as shown in FIG. 3. In the example of FIG. 3, the names of all intersections (streets) where the vehicle is to turn right or left during travel from the starting point to the destination are displayed up to the destination (for example, DEL AMO FASHION CENTER) in sequence. In addition, the travel direction of the vehicle (right turn or left turn) at every intersection is displayed by an arrow on the display.

Figure 4:
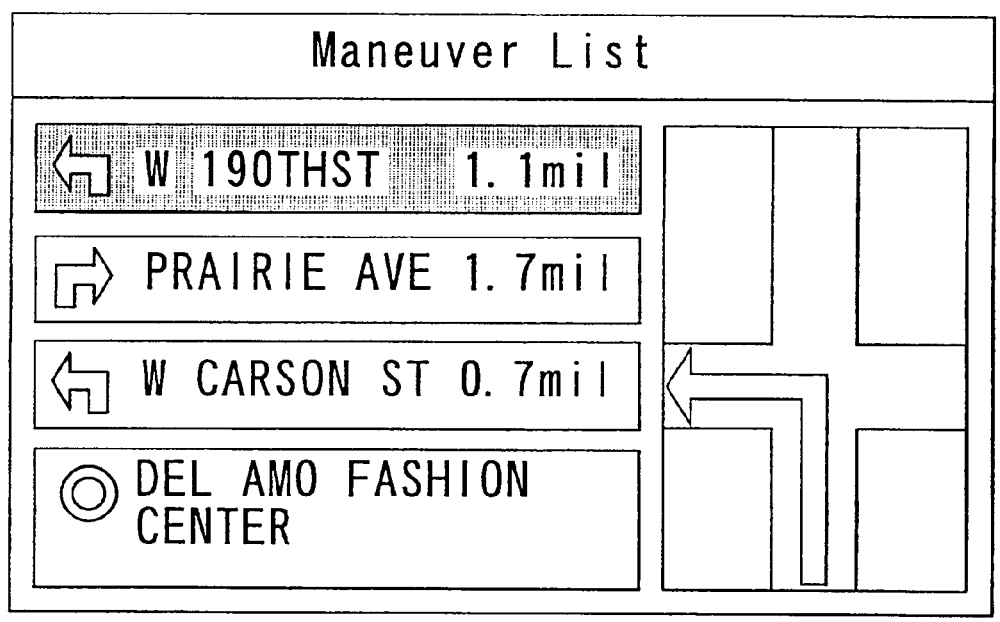
FIG. 4 is an exemplary diagram of a display screen in a state wherein a specific intersection included in the guidance route is selected.

Then, the user moves the joy stick 31 of the remote control transmitter 30 in an up/down direction, thereby selecting the intersection corresponding thereto in due order. As illustrated in FIG. 4, the name of the selected intersection is displayed in reverse video. Furthermore, on the right side of the screen there is displayed the form of the selected intersection and the arrow indicating the travel direction (right turn or left turn) across the selected intersection. In a case where there are a great number of intersections in the route, the user can scroll through the list of intersections by moving the joy stick 31 in the up/down direction. This allows the user to select an arbitrary intersection from all intersections between the starting point and the destination.

Figure 5:
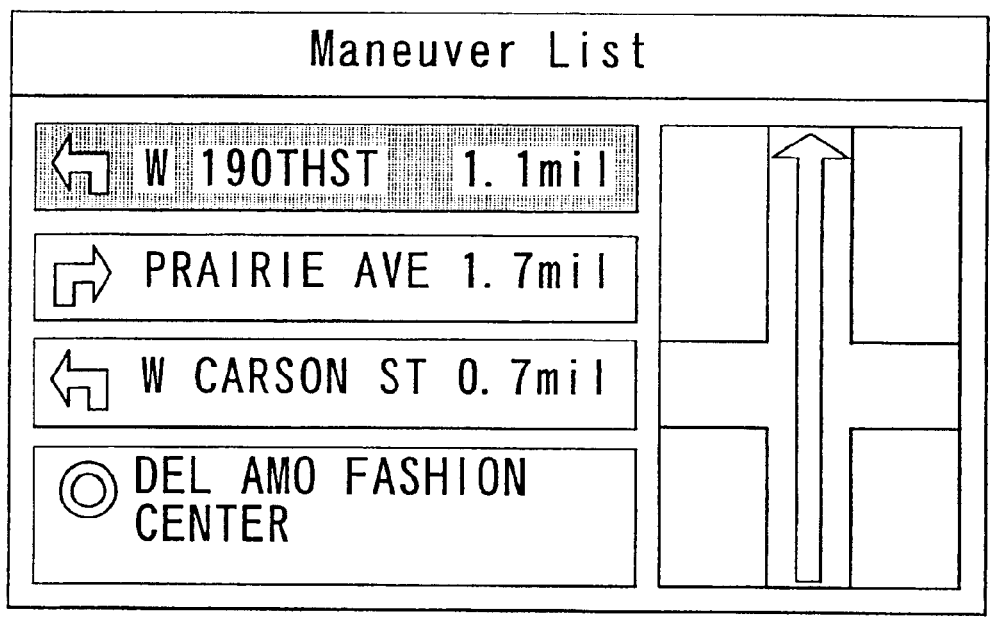
FIG. 5 is an exemplary diagram of a display screen in a travel-direction selected mode.

When the user selects his/her desired intersection by pushing the "set" button 32, the display enters a travel-direction selected mode. In this travel-direction selected mode, the direction of the arrow indicative of the vehicle travel direction is adjusted according to the moving direction of the joy stick 31. For instance, if the joy stick 31 is moved upwardly, the arrow drawn in an enlarged view of the intersection has its direction changed into a straight direction as shown in FIG. 5. If the joy stick 31 is moved rightward, the direction of the arrow is changed into the right-turn direction. In FIG. 5, after the direction of the arrow is changed into the straight direction such that the vehicle goes straight through the intersection, the "set" button 32 is pushed again, thereby enabling the user to give the navigation device a command that the vehicle should progress straight beyond the intersection.

If the user pushed the "return" button 34 instead of the "set" button 32, this screen returns to the previous screen as shown in FIG. 3, which appears just after the guidance route search. In a case where travel of the vehicle in the travel direction designated by the user is prohibited due to traffic control or the like, there is displayed a message describing the prohibition, to prevent the user from selecting the prohibited direction.

When an intersection and the travel direction beyond the intersection are designated, the controller 17 sets low the link cost of the road which leads from the designated intersection in the designated direction, and performs a simulated calculation, such as the lateral search method or the Dijkstra method, to conduct a route search for another guidance route (second route) from the intersection to the destination. Subsequently, this resultant guidance route, namely the second route, is connected to the portion of the guidance route (first route) which leads from the starting point to the intersection, to thus provide a new guidance route from the starting point to the destination.

As described above, the method of the present invention provides a guidance route to meet the user's needs. It is noted that if the new guidance route still includes a portion, an intersection, or a road against the user's preferences, another intersection and a new travel direction from the intersection can be designated again. As a result, even in such cases, a guidance route matching the user's needs can be obtained.

In the preferred embodiment of the present invention, a guidance route is searched for that leads through the user's designated intersection in a designated direction, resulting in an advantage that a guidance route matching the user's needs is found. This prevents the user from being guided to a road where he/she does not wish to pass, thereby allowing the user to drive to the destination comfortably.

(Modifications)

Figure 6:
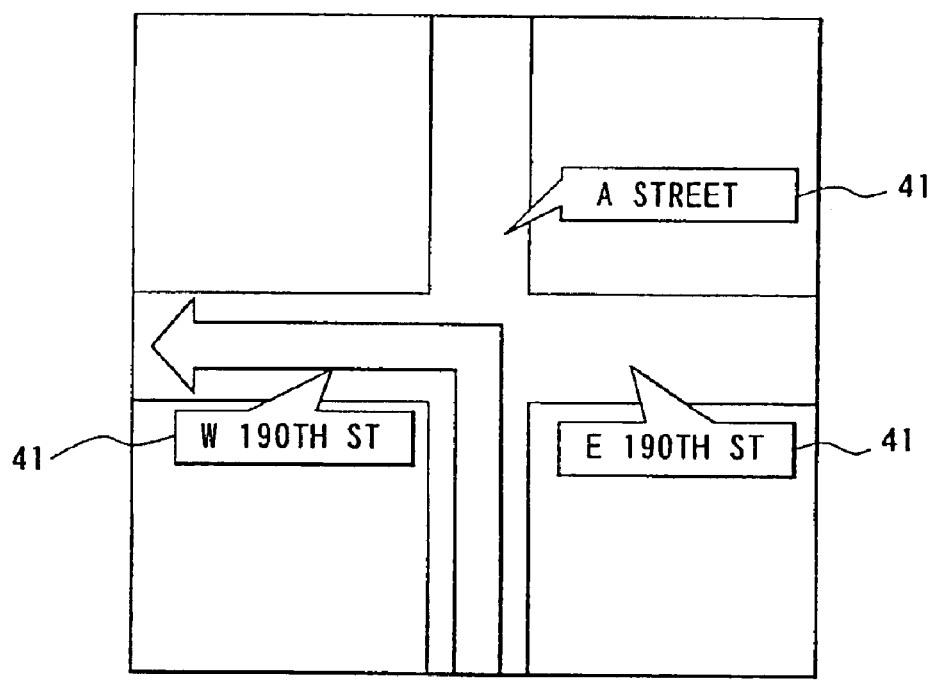
FIG. 6 is a schematic diagram illustrating modifications of the preferred embodiment and showing a state where all the streets branching from an intersection have their names displayed in the form of a balloon.

When displaying the enlarged view of the intersection as shown in FIG. 4, the names of all streets (or all districts) branching off from the intersection may be displayed in the form of a balloon (with text) 41 as illustrated in FIG. 6. In this case, a touch panel may be attached onto the screen of the display 7, and the balloon 41 indicating the street name may be pushed manually, thereby designating the travel direction.

Figure 7:
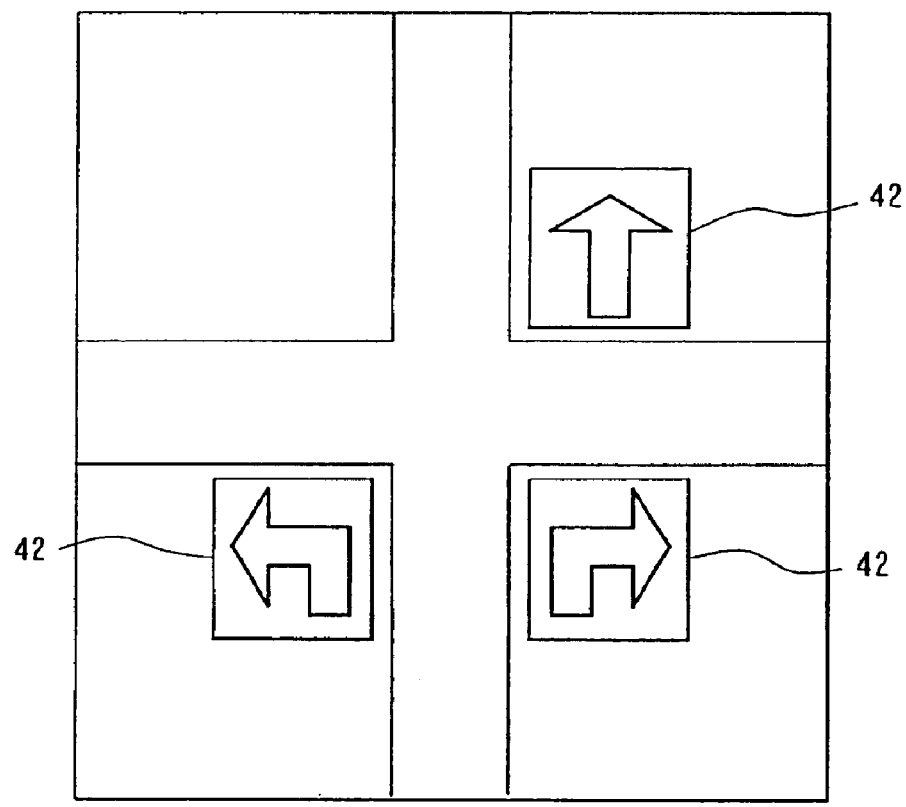
FIG. 7 is a schematic diagram illustrating other modifications of the preferred embodiment and showing a state wherein the possible travel directions beyond an intersection are displayed by an icon.

Further, as shown in FIG. 7, in the vicinity of the intersection there may be provided icons 42 with arrows indicating the possible travel directions. In this case also, a touch panel may be attached onto the screen of the display 7, and the part of the touch panel corresponding to the desired icon 42 may be pushed manually, thereby designating the travel direction.

Still further, the intersection and the travel direction may be designated by voice. For example, in a state where all the intersections up to the destination are displayed in list form on the screen as shown in FIG. 3, when the user says "Go straight on W 190th street," the navigation device recognizes an order from the user by voice recognition to display the screen of FIG. 5. Then, for example, when the user says "OK," the navigation device begins to perform a route search for a guidance route from the recognized intersection to the destination, and subsequently connects this resultant guidance route and a previously set guidance route from the present vehicle position to the intersection.

In this case, the voice recognizer 14 can restrict a range of the dictionary for the voice recognition to only the names of the intersections listed on the display 7 and the terms indicative of the travel directions (for example, left turn, right turn, or straight), and can recognize the voice on the basis of the restricted range of the dictionary, thus facilitating the voice recognition, so that there is no risk of misidentification.

In the described embodiments, the guidance route (first route) from the starting point to the destination is searched for, and then an intersection included in the guidance route and the travel direction beyond the intersection are designated. The present invention, however, is not limited to this case. First, the user may designate an intersection it is desired to pass through, and a travel direction beyond the intersection. The navigation device may then search for a guidance route leading from the starting point to the destination through the intersection previously designated. Particularly, when the user designates the intersection as a transit point, the navigation device displays an enlarged view of the intersection, thereby enabling the user to designate the travel direction in the same way as in the above-mentioned embodiments. In this case, a plurality of intersections may be selected and designated. The navigation device sets low a link cost of a road which leads from the designated intersection in the designated direction, to perform the route search for the guidance route leading to the destination through the designated intersection in the designated direction.

As can be clearly understood from the foregoing explanation, according to the guidance route search method of the present invention, when the user designates an intersection and the travel direction beyond the intersection, the navigation device performs a route search for the guidance route leading through the designated intersection in the designated direction up to the destination, thus providing a guidance route to meet the user's needs. This can prevent the user from being guided to an undesirable road, and allows the user to drive very comfortably.

What is claimed is:

1. A method of searching for a guidance route from a starting point to a destination in a navigation device, comprising:

when an intersection and a travel direction of a vehicle beyond the intersection are designated by a user, reducing a link cost of a road which leads from the designated intersection in the designated direction in response to the user designation; and searching for a guidance route from the starting point to the destination through said intersection.

2. The guidance route search method according to claim 1, wherein said travel direction is designated by selling a direction of an arrow for indicating a travel direction by an operation of a key.

3. The guidance route search method according to claim 1, wherein, in a case where travel of the vehicle in the travel direction designated by a user is prohibited, a message describing the prohibition is displayed.

4. The guidance route search method according to claim 1, wherein, in a case where the travel of the vehicle in the travel direction designated by the user is prohibited, said travel direction is rendered unselectable.

5. The guidance route search method according to claim 1, wherein, after the user designates the intersection to pass through and the travel direction beyond said intersection, the guidance route is searched for that leads from the starting point to the destination through said intersection.

6. A method of searching for a guidance route from a starting point to a destination in a navigation device, comprising:

searching for a first route from the starting point to the destination;

when a specific intersection from one or more intersections included in said first route and a travel direction of a vehicle beyond said specific intersection are designated by a user, searching for a second route that leads from said specific intersection in said designated travel direction up to the destination;

connecting said second route and the portion of said first route, that extends between the starting point and said specific intersection, to form the guidance route; and displaying the guidance route as a combination of said portion of said first route and said second route.

7. The guidance route search method according to claim 6, wherein, after searching for the first route, a plurality of intersections included in said first route is displayed on a display in list form.

8. The guidance route search method according to claim 7, wherein the specific intersection and the travel direction are designated by voice instruction.

9. The guidance route search method according to claim 7, wherein on said display is displayed an enlarged view of said specific intersection, and the travel direction is designated with reference to said enlarged view.

10. The guidance route search method according to claim 9, wherein the names of a plurality of streets branching from said specific intersection are displayed, and one of said street names is selected, thereby designating the travel direction.

11. The guidance route search method according to claim 9, wherein arrow-icons, each of which indicates a travel direction, are displayed in the vicinity of said specific intersection, and one of the arrow-icons is selected, thereby designating the travel direction.

12. The guidance route search method according to claim 9, wherein the travel direction is designated by means of a touch panel mounted on a screen of the display.

13. A method of searching for a guidance route in a navigation device, comprising:

identifying a starting point and a destination;

receiving a designation from a user for at least one intersection and, for each designated intersection, a travel direction of a vehicle beyond the intersection;

reducing a link cost of a road corresponding to the designated travel direction from a designated intersection in response to the user designation; and searching for a guidance route from the starting point to the destination through the at least one designated intersection.

14. The guidance route search method according to claim 13, wherein the travel direction is designated by a user selecting one of a displayed road branching from the designated intersection and a displayed icon that indicates a travel direction from the designated intersection.

15. A method of searching for a guidance route in a navigation device, comprising:

identifying a starting point and a destination;

searching for a first route from the starting point to the destination;

identifying at least one intersection along the first route;

receiving a designation from a user for at least one of the identified intersections and, for each designated intersection, a travel direction of a vehicle beyond the intersection;

searching for a second route that passes through the at least one designated intersection and associated designated travel direction, to the destination;

connecting the second route and the portion of the first route, that extends between the starting point and the beginning of the second route, to form the guidance route; and displaying the guidance route as a combination of said portion of said first route and said second route.

16. The guidance route search method according to claim 15, wherein the at least one designated intersection is selected by a user from a plurality of intersections along the first route that are displayed to the user.

17. The guidance route search method according to claim 15, wherein the travel direction is designated by a user selecting one of a displayed road branching from the designated intersection and a displayed icon that indicates a travel direction from the designated intersection.

* * * * *